United States Patent Office 2,874,878
Patented Feb. 24, 1959

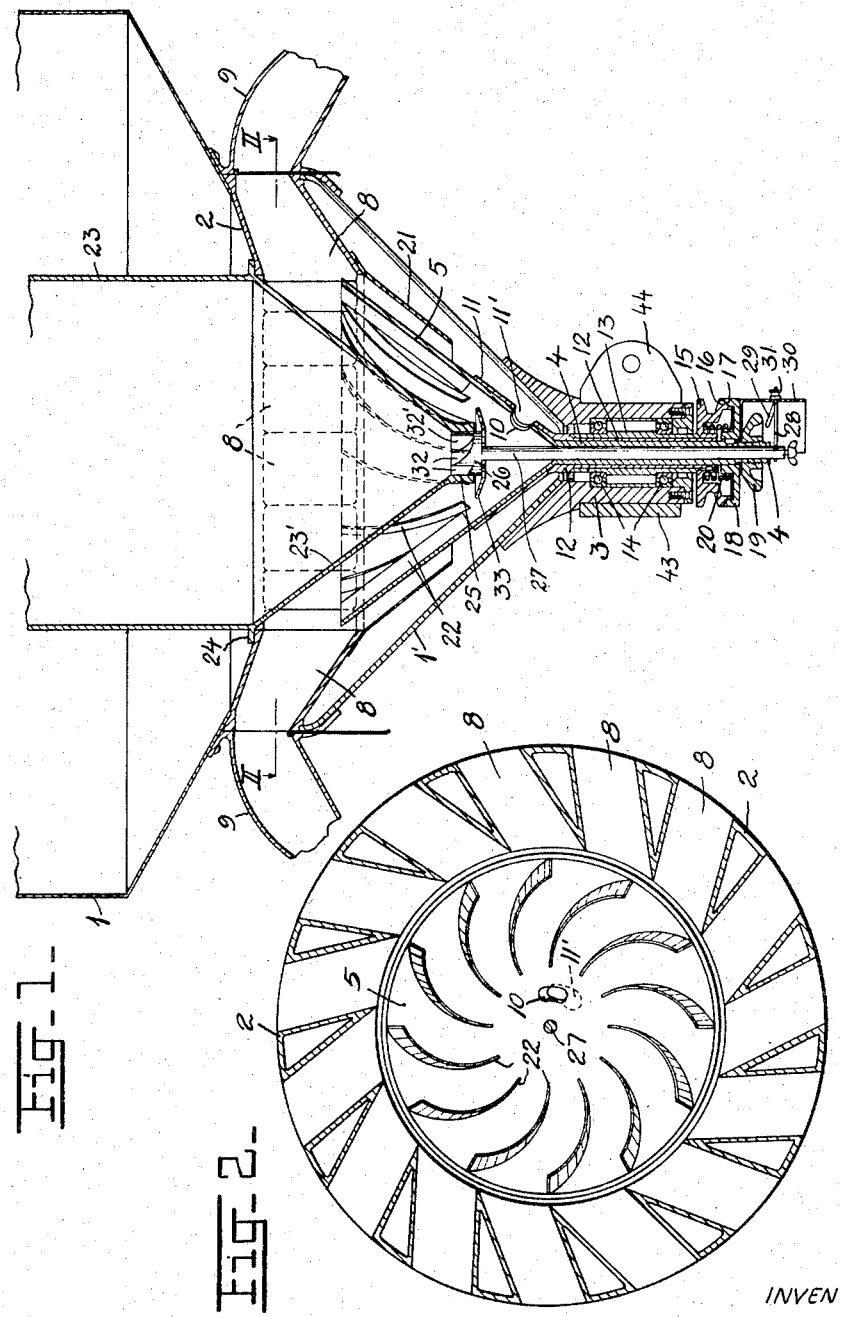

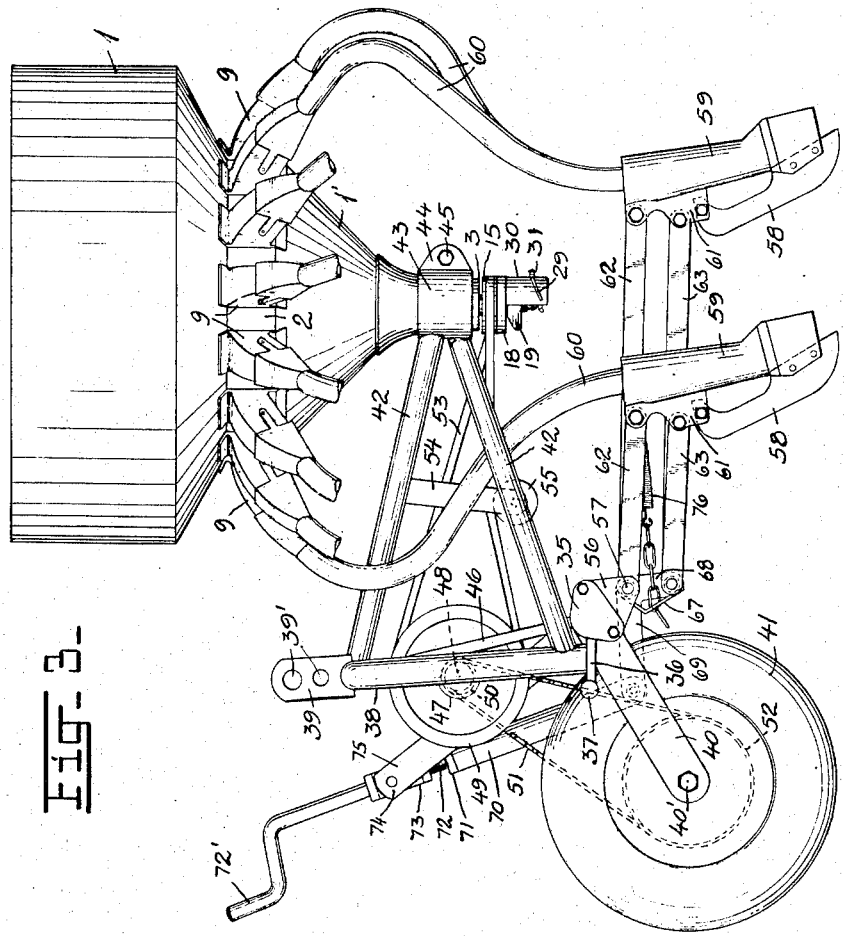

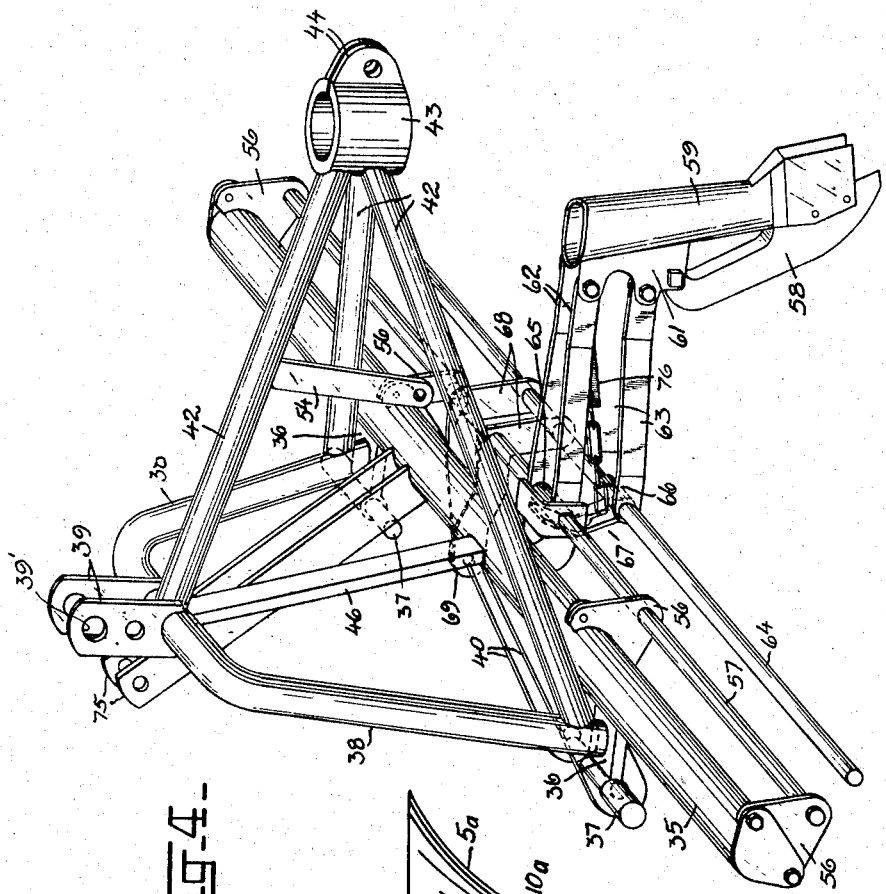

2,874,878

DISPENSERS FOR AGRICULTURAL MACHINES

Sigmund Stokland, Oslo, Norway

Application April 2, 1956, Serial No. 575,446

Claims priority, application Norway April 14, 1955

19 Claims. (Cl. 222—177)

This invention relates to an agricultural machine for use as a seed planter and/or fertilizer distributor.

It is an object of the invention to provide a simplified and inexpensive machine by means of which all types of seed or corn may be planted with similar uniformity and exactness in predetermined quantities which may be regulated at will, and by means of which two different types of seed, or seed and fertilizer, may be planted or distributed simultaneously by means of a single, common distributing member.

According to the invention there is provided an agricultural machine for use as a seed planter and/or fertilizer distributor, wherein an upwardly diverging cup is mounted for rotation about a vertical axis, there being at least one opening in the lower part of said cup, and wherein a plurality of angularly spaced ports or channels is formed in an annular member surrounding the upper edge of the cup, each such port or channel communicating with a respective drill or planting plough, there being means for feeding material to be planted or distributed to the exterior of the lower part of said cup so as to submerge said lower part, the arrangement being such that, when the machine is in operation, the cup rotates and the material flows through said opening(s) to the interior of the cup, where, due to the rotation thereof, said material flows upwardly and is expelled through said ports or channels.

For a better understanding of the invention and to show how the same may be carried into effect, reference will now be made to the accompanying drawings in which:

Figure 1 is a vertical, axial section through the seed container of an agricultural machine for use as a seed planter and/or fertilizer distributor, Figure 2 is a sectional plan view on the line II—II of Figure 1, with part of the machine removed, Figure 3 is a side elevation of the machine with parts removed for clarity, Figure 4 is a perspective view of the supporting framework of the machine, and Fig. 5 is a side elevation of a modified distributor cup.

Referring now to the drawings, there is shown a seed planter and/or fertilizer distributor having a cylindrical seed container 1 formed with a frusto-conical base, which is connected by means of an apertured, annular, middle piece or separator 2 to a conical or funnel-shapel lower container 1', there being a support sleeve 3 formed for the reception of the lower container 1'. A vertical hollow shaft 4 is rotatably and axially mounted in the support sleeve 3, and carries at its upper end an upwardly diverging, rotatable distributing funnel 5. The funnel 5 is shown as being conical in shape, but may, however, be parabolic, or generally upwardly divergent in shape. Fig. 5 shows a funnel 5a of parabolic shape with two openings 10a therein.

The funnel 5, which may be integral with the hollow shaft 4, or be secured thereto, has its axis vertical and the lower portion thereof is radially spaced from the lower walls of the container 1' so that the lower portion is submerged in the seed in the container 1', when the machine is in use.

At the level of the upper edge of the funnel 5, the middle piece 2 of the seed container is formed with a plurality of ports or channels 8, which are evenly spaced around the piece 2, each of the channels communicating with an outer tube-like member or material receiving devices 9.

In the lower portion of the rotatable funnel 5, an opening 10 is formed, the opening 10 communicating with the bottom of the lower container 1'.

In order to regulate the free area of the opening 10 a rotatable closure funnel 11 is provided, the funnel 11 having the shape of a hollow cone, and surrounding the lower portion of the funnel 5. The funnel 11 is formed with an opening 11', so positioned that it can register with the opening 10 and form a passage leading from the interior of the funnel 5 to the exterior thereof. By rotating the funnel 11 about the funnel 5, the area of the outlet of the passage may be reduced or increased, as desired, depending upon the extent to which the opening 11' is brought to register with the opening 10, and the extent of the angular displacement of the funnel 11. There may, however, be more than one opening 10 formed in the funnel 5, in which case the funnel 11 is formed with a corresponding number of openings 11' for registering with the openings 10.

The closure funnel 11 is integral with, or secured onto the end of a hollow shaft 12 which is co-axial with the shaft 4 of the rotatable funnel 5, and which is mounted so as to be rotatable about the shaft 4 by means of a sleeve 13 and ball bearings 14, in the support sleeve 3.

A V-belt pulley 15 is secured on the lower end of the hollow shaft 12 of the closure funnel 11, the pulley 15 having a friction surface 16 formed on its lower face for cooperating with a corresponding friction surface 17 formed on a disc-shaped locking member 18 mounted so as to be axially displaceable, but not rotatable on the hollow shaft 4.

The lower end of the shaft 4 is formed with screw-threading with which a nut 19 co-operates so as to force the locking member 18 against the pulley 15, and thereby to bring the friction surfaces 16 and 17 into engagement with one another so that relative movement between the hollow shafts 4 and 12 is prevented.

In order to adjust the closure funnel 11 and nut 19 is loosened and the pulley 15 and the funnel 11 are angularly displaced relative to each other, a coiled spring 20, interposed between the pulley 15 and the member 18, serving to separate the member 18 from the pulley 15 when the nut 19 is loosened.

When the machine is in operation and the funnel 5 rotates at a suitable speed, seed or corn flows from the container 1 into the container 1' to the exterior of the lower part of the funnel through the opening 10 into the lower part of the funnel 5. Due to centrifugal force, the seed flows upwardly along the diverging wall of the funnel 5 and is expelled from the funnel and thrown into the ports or channels 8. Seeds which do not pass out through the channels 8 fall down to the bottom of the container 1' and are repeatedly fed into the funnel 5 through the opening 10 therein. In order to guide the seed which is not expelled through the channels 8 during its return, a funnel shaped baffle 21 is secured to the middle piece 2 of the container, such baffle also serving to restrict the flow of seed to the exterior of the lower part of the funnel 5.

The amount of seed, which, in this manner is thrown into the channels 8, may be regulated exactly by adjusting the free area of the opening 10. The seed centrifugally discharged from the funnel 5 is evenly distributed around the whole circumferential edge thereof, and thereby an even and equal discharge through the respective channels 8, is obtained.

In order to maintain an even seed distribution around the circumferential edge of the funnel 5 when the axis of rotation thereof has a considerable inclination to the vertical, the funnel is provided on its inner surface with a number of radial vanes 22, extending from the upper edge of the funnel 5 to a suitable distance from the bottom thereof. The vanes 22 are curved backwardly with respect to the intended direction of rotation of the funnel 5. By this arrangement, seed fed into the funnel 5 is evenly distributed around the funnel in the region of the free part of the funnel below the lower ends of the vanes 22, and is distributed upwardly between the vanes. The seed is then guided by the vanes 22, and is centrifugally expelled at the upper edge of the funnel 5, as previously mentioned. Thus, the vanes 22 maintain an even distribution of seed in the funnel 5, even if the axis thereof is considerably inclined with respect to the vertical.

In order to enable two different types of seed, or seed and fertilizer to be distributed simultaneously by one and the same rotatable funnel, and to enable the ratio of the two quantities of seed, or seed and fertilizer to be regulated at will, a second container 23 is mounted centrally within the container 1 and rests on the middle piece 2 by means of a flange 24, the container 23 having a funnel-shaped lower portion 23' extending into the funnel 5.

The second container 23 is provided with a sleeve-shaped outlet 25, the axis of which coincides with the axis of the funnel 5.

The outlet is normally closed by means of a cylindrical valve-member or head 26 slidably received in the outlet 25, and mounted on the upper end of a shaft 27 supported so as to be slidable and rotatable in the hollow shaft 4 of the funnel 5. At its lower end, the shaft 27 projects beyond the shaft 4, and is provided with a radially projecting pin 28 extending through a slit 29 which is inclined to the horizontal, and which is formed in a semi-tubular cover 30 secured to the locking member 18. A nut 31 threaded onto the end of the pin 28 and projecting outside the cover 30, serves to retain the pin 28 in a desired position in the slit 29. By this arrangement the shaft 27 carrying the head 26 is normally locked with the funnel 5 so as to be rotatable therewith.

The cylindrical head 26 is formed with a number of circumferentially spaced grooves 32 extending from the upper end to near the lower end thereof, so that a short, right-cylindrical portion remains at the lower end of the head 26 (as shown in Figure 1). Each of the grooves 32 is confined by a surface extending in an axial plane, and a curved surface 32' initially extending at right angles to an axial plane, so that the groove has a cross-section which gradually decreases in area in a downward direction.

In its closing position, the head 26 projects into the outlet sleeve 25 to such extent that the lower cylindrical portion of the head is received in the mouth of the sleeve which thus closes the ends of the grooves 32.

In order to regulate the quantity of seed or fertilizer fed from the second container 23, the head 26 is moved axially relative to the sleeve 25 so as to uncover more or less the ends of the grooves 32. This is accomplished by loosening the nut 31 so that the radially projecting pin 28 may be angularly displaced in the slit 29. During such displacement, the pin 28 and the shaft 27 connected therewith are raised or lowered, depending upon the direction of displacement, due to the pitch of the slit 29.

A cup-shaped disc 33 is secured at the lower end of the head 26 and serves to prevent material or seed from being expelled through the grooves 32 if the grooves are uncovered, when the machine stops, and thereby the rotation of the funnel 5 ceases. The seed, or material accumulates on the disc 33 and prevents further flow of seed or material from the container 23. However, as soon as the funnel 5 starts to rotate again, the disc 33 and head 26 rotate, so that the seed accumulated on the disc is expelled, and normal discharge through the grooves 32 is restored.

The second container 23 may contain fertilizer or seed of a type different from that in the container 1, so that seed and fertilizer, or two different types of seed may be discharged or sown simultaneously by means of the rotatable funnel 5, the second container 23 and the middle piece 2 ensuring that seed from the container 1 is fed only to the exterior of the lower part of the funnel 5.

When a small quantity of seed is to be sown, only the second container 23 is used, and the opening 10 in the funnel 5 is closed, whereby the seed in the second container may be discharged continuously.

The seed containers are supported by a frame which is adapted for attachment to a tractor, and which is pivotally connectable with pivoted hitch links so as to extend rearwardly of the tractor.

The main carrying member of the frame is constituted by a cross tube 35 which carries two brackets 36, spaced apart and projecting forwardly and transversely to the tube 35. Each bracket carries a stud 37 to which the end of a lower hitch link (not shown) may be pivotally connected. A tubular bow 38 having its free ends secured to the brackets 36 projects substantially vertically upwards and, at its topmost part, carries lugs 39 formed with openings 39' for the reception of a pivot to which the single top link of the hitch links may be connected.

Transversely extending arms 40 are secured to the middle of the tube 35, and are inclined forwardly and downwardly for supporting a ground wheel 41 by means of a stud 40'. A lower strut 42 is secured to the lower end of each leg of the bow 38, and a similar upper strut 42 is secured to the topmost part of the bow. The struts 42 converge rearwardly and the rear ends thereof carry a split clamping sleeve 43 the axis of which is vertical. The sleeve 43 is adapted to receive the support sleeve 3 at the lower end of the seed containers, and is provided at each side of the split with apertured lugs 44 for the reception of a clamping screw 45.

An arm 46, having one end secured to the tube 35 and the other to the topmost part of the bow 38 supports a bearing 47 for a stud 48 on which a V-belt pulley 49 is rotatably supported. A sprocket 50 is secured to the pulley 49, and is driven by a chain 51 from a sprocket 52 secured to the ground wheel 41, so that when the latter is driven along the ground the pulley 49 is driven in the same direction. A V-belt 53 connects the pulley 49 with the pulley 15 on the shaft 12, and that part of the belt 53 which runs onto the pulley 15 is guided by a roll 55 rotatably mounted on an arm 54 secured to the upper strut 42.

The cross tube 35 also carries transverse rearwardly projecting brackets 56 which are spaced apart along the tube and which support a shaft 57 positioned parallel to the tube 35. A number of drills, or planting ploughs 58 are supported on the shaft 57, each drill having a guiding funnel 59 which receives the lower end of a flexible tube 60 leading from a respective tube-shaped member 9 secured to the middle piece 2 of the seed containers.

Each planting plough 58, with its associated funnel 59, is secured to a support member 61 to which upper and lower links 62 and 63, respectively are pivotally secured. The other ends of the upper links 62 are pivotally secured on the shaft 57, while the other ends of the lower links 63 are pivotally secured on a shaft 64 which is parallel to the shaft 57 and which passes freely through all the links 63 associated with each planting plough (only one such plough being shown in Figure 4).

Distance sleeves 65 and 66, respectively, are rotatably supported between the ends of the links 62 and 63 on each of the shafts 57 and 64, the sleeves being rigidly interconnected by means of an arm 67.

Thus, the shaft 64 is supported from the shaft 57 by means of a number of arms 67 corresponding to the number of support members 61. The shaft 64 may be swung about the axis of the shaft 57 so as to permit the height of the ploughs 58 to be adjusted. In order to obtain this movement of the shaft 64, a pair of spaced angle levers are rotatably mounted on the shaft 57 the arms 68 of which are pivotally secured to the shaft 64, while the other arms 69 of which are pivotally connected to the lower end of a tube 70. The tube 70 has a nut 71 secured to its upper end, and a screw 72 co-operating with the nut 71 is supported so as to be rotatable but not axially displaceable in a sleeve 73 pivotally supported by means of studs 74 at the upper ends of arms 75 projecting upwardly from the tube 35. The screw 72 is formed at its upper end with a crank-handle 72′, and by turning the crank-handle 72′ the angle lever 68, 69 is angularly rotated on the shaft 57 and thereby the ploughs 58 are lifted or lowered.

In order to force the planting ploughs resiliently towards the ground, a regulatable spring 76 is secured between the upper links 62 and the lower part of the arm 67 associated with each support member 61.

I claim:

1. In an agricultural machine of the character described, in combination: a container in which the material intended for distribution by said machine is stored, an upwardly diverging substantially cup-shaped member having an upper edge, an axis of symmetry, and mounted in said container for rotation about said axis, said cup-shaped member having an upper part terminating in an open top and a lower part having at least one opening therein, means for rotating said cup-shaped member, a plurality of material receiving devices in communication with said container in the proximity of the upper edge of said cup-shaped member and, separator means in said container spaced from said open top of said cup-shaped member for guiding the material intended for distribution to the exterior of said cup-shaped member and through said opening into said cup-shaped member, the machine operating in such manner that, when said cup-shaped member is rotated, the material in said cup-shaped member flows upwardly toward and past said upper edge thereof and into said material receiving devices.

2. The combination according to claim 1, further including a baffle member depending from said separator means and spacedly surrounding said upper part of said cup-shaped member.

3. The combination according to claim 1, wherein said cup-shaped member is of conical contour and said container has a lower part of conical shape, said material receiving devices being in communication with said container above said lower part thereof.

4. The combination according to claim 1, wherein said cup-shaped member is of parabolic shape.

5. The combination according to claim 1, further including a frame having means for supporting said container and said material receiving devices, each of said material receiving devices including a flexible tubular member in communication with said container, and a ground wheel rotatably attached to said frame and operatively connected with said means for rotating said cup-shaped member, whereby said cup-shaped member is rotated when said machine is set in motion.

6. The combination according to claim 1 wherein said cup-shaped member includes a plurality of vanes substantially uniformly spaced from one another and extending from said upper edge downwardly into said cup-shaped member to a point above said opening therein.

7. The combination according to claim 6, wherein said vanes are curved backwardly with respect to direction of rotation of said cup-shaped member.

8. The combination according to claim 1, further including a closure member slidably surrounding at least said lower part of said cup-shaped member, said closure member having at least one aperture registerable with an opening in said cup-shaped member upon rotation of said closure member about said cup-shaped member, and means for locking said closure member in selected positions to control the area of said opening.

9. The combination according to claim 8, further including a first substantially vertical shaft coaxial with and having an upper end connected to said lower part of said cup-shaped member and a lower end extending from said container, a hollow second shaft coaxially surrounding said first shaft and having its upper end connected with said closure member, and coupling means for selectively connecting said first shaft with said second shaft, said means for rotating said cup-shaped member being operatively connected with said second shaft externally of said container.

10. The combination according to claim 9, further including a support sleeve connected with and supporting said container, said sleeve coaxially and rotatably receiving said first shaft and said second shaft between said container and said means for rotating said cup-shaped member.

11. The combination according to claim 9, wherein said means for rotating said cup-shaped member includes a V-belt pulley non-rotatably mounted on said second shaft, and said coupling means includes a member non-rotatably mounted on said first shaft and adjacent said pulley, resilient means for permanently urging said member away from said pulley, and locking means for releasably connecting said pulley with said member against the action of said resilient means, whereby said cup-shaped member and said closure member may be rotated independently upon release of said locking means.

12. The combination according to claim 11, further including a support sleeve connected with and supporting said container, said sleeve coaxially and rotatably receiving said first shaft and said second shaft between said container and said pulley.

13. The combination according to claim 1 further including a second container in said separator means having an outlet for discharge of material from said second container into the interior of said cup-shaped member, and means for regulating the area of said outlet.

14. The combination according to claim 13, wherein said means for regulating the area of said outlet includes a shaft coaxially extending into said cup-shaped member, means mounted externally of said first-named container for vertically adjusting said shaft, and a valve member at the upper end of said shaft for varying the discharge area of said outlet upon vertical adjustments of said shaft.

15. The combination according to claim 14, further including a first hollow shaft coaxially surrounding said shaft, said first hollow shaft having an upper end connected with said lower part of said cup-shaped member and a lower end extending from said first-named container, a second hollow shaft coaxially surrounding said first hollow shaft, coupling means for releasably connecting said first hollow shaft with said second hollow shaft, said means for rotating said cup-shaped member being connected with said second hollow shaft externally of said first-named container, and a closure member slidably surrounding said lower part of said cup-shaped member in said first-named container, said closure member being coaxial with and connected to the upper end of said second hollow shaft and having at least one aperture registerable with an opening in said cup-shaped member upon rotation of said closure member about said cup-shaped member.

16. The combination according to claim 14, wherein said means for vertically adjusting said shaft includes a radially extending pin at the lower end of said shaft, a member stationary with respect to said shaft and having an inclined slot with said pin extending therethrough, and locking means attachable to the free end of said pin for maintaining said pin and said shaft in selected positions with respect to said member.

17. The combination according to claim 14, wherein said outlet in said second container is a round outlet and said valve member is of cylindrical contour adapted to be received in said outlet upon upward displacement of said shaft, said valve member having a plurality of circumferentially spaced grooves extending from the upper face of said valve member and terminating in the peripheral surface and adjacent the lower end thereof, the cross-sectional areas of said grooves diminishing from said upper face toward said peripheral surface of said valve member.

18. The combination according to claim 17, further including an upwardly diverging disc member coaxially connected with said shaft in said cup-shaped member adjacent said valve member, the diameter of said disc member being larger than the diameter of said outlet in said second container.

19. In a machine for distributing granulate or pulverulent material, in combination: a container for the material, a plurality of uniformly spaced material receiving devices in communication with said container in a substantially horizontal plane, an upwardly diverging cup-shaped member having an upper part with a substantially horizontal edge at the approximate level of said horizontal plane and a lower part having a closed bottom and at least one opening in the proximity of said bottom, said cup-shaped member being rotatably mounted in said container in such manner that said lower portion is immersed in the material in said container, and means for rotating said cup-shaped member, the machine operating in such manner that, when said cup-shaped member is rotated, the material flows through said opening into said cup-shaped member and is expelled into said material receiving devices.

References Cited in the file of this patent

UNITED STATES PATENTS 2,601,534     Laffoon ---------------- June 24, 1952

FOREIGN PATENTS 650,829     France ------------------ Oct. 1, 1928